United States Patent
Hsu

(10) Patent No.: US 8,649,465 B2
(45) Date of Patent: Feb. 11, 2014

(54) METHODS AND APPARATUSES FOR ADAPTIVE CLOCK RECONSTRUCTION AND DECODING IN AUDIO FREQUENCY COMMUNICATION

(75) Inventor: Chia-Sheng Hsu, Hsin-Chu (TW)

(73) Assignee: Generalplus Technology Inc., Hsinchu (TW)

( * ) Notice: Subject to any disclaimer, the term of this patent is extended or adjusted under 35 U.S.C. 154(b) by 982 days.

(21) Appl. No.: 12/707,332

(22) Filed: Feb. 17, 2010

(65) Prior Publication Data

US 2010/0310012 A1 Dec. 9, 2010

(30) Foreign Application Priority Data

Jun. 6, 2009 (TW) ................................ 98118882 A

(51) Int. Cl.
*H03D 3/00* (2006.01)
(52) U.S. Cl.
USPC .......................................... 375/334; 375/303
(58) Field of Classification Search
USPC ......... 375/354, 326, 327, 344, 345, 339, 334, 375/303
See application file for complete search history.

(56) References Cited

U.S. PATENT DOCUMENTS

| | | | | |
|---|---|---|---|---|
| 4,878,035 A | * | 10/1989 | Vendely et al. | 332/101 |
| 6,078,578 A | * | 6/2000 | Matsumoto | 370/350 |
| 7,620,396 B2 | * | 11/2009 | Floam et al. | 455/434 |
| 2004/0190663 A1 | * | 9/2004 | Carsello et al. | 375/354 |
| 2010/0055001 A1 | * | 3/2010 | Ikeda et al. | 422/108 |
| 2010/0215835 A1 | * | 8/2010 | Khoury et al. | 427/8 |
| 2012/0093202 A1 | * | 4/2012 | Tsuchida | 375/219 |
| 2012/0328121 A1 | * | 12/2012 | Truman et al. | 381/94.3 |

* cited by examiner

*Primary Examiner* — Emmanuel Bayard
(74) *Attorney, Agent, or Firm* — Muncy, Geissler, Olds & Lowe, PLLC

(57) ABSTRACT

The invention relates to methods for adaptive clock reconstruction and decoding in audio frequency. The method includes the steps of: receiving a modulated signal, wherein the modulated signal is modulated by RC-FSK (Return to Carrier Frequency Shifting Keying); performing a spectrum analysis to the modulated signal to obtain a plurality of frequency envelopes; storing the frequency envelopes; searching the peak values of the frequency envelopes and the time points corresponding to the peak values to modify an estimated period; and generating a clock period for the RC-FSK demodulation and a clock phase for the RC-FSK demodulation according to the estimated period.

21 Claims, 7 Drawing Sheets

METHODS AND APPARATUSES FOR ADAPTIVE CLOCK RECONSTRUCTION AND DECODING IN AUDIO FREQUENCY COMMUNICATION

This application claims priority of No. 098118882 filed in Taiwan R.O.C. on Jun. 6, 2009 under 35 USC 119, the entire content of which is hereby incorporated by reference.

BACKGROUND OF THE INVENTION

1. Field of the Invention

The present invention relates to the RC-FSK (Return to Carrier Frequency Shifting Keying) modulation system and the decoding technique thereof, and more particularly to a method and an apparatus for adaptive clock reconstruction and a method and an apparatus for decoding in audio frequency communication.

2. Related Art

In communication system, modulation is a process of implanting information to a carrier signal and the information is combined into the carrier signal to transfer the original information to a electrical signal adapted for transmission. Generally speaking, modulation is used for wireless broadcast, wireless communication or digital communication on telephone line and so on. Depending on the difference of the modulated signals, the modulations can be sorted by digital modulation (FSK, ASK, PSK) and analog modulation (FM, AM, PM). Those different modulations are techniques utilizing different methods to combine information with carrier. The reverse process of modulation calls demodulation which is used for restoring the original information.

Modem (modulation and demodulation) technology in audio frequency communication is used in recent years. It mainly utilizes the audio frequency carrier to transmit digital information by TV, radio, audio, and so widely used the traditional audio equipment.

The modem technology about multi-carrier with QPSK (Quadrature Phase Shift Keying) in demodulation in audio frequency is depicted in U.S. Patent Publication No. 20030212549A1 and U.S. Patent Publication No. 20040001553A1. The abovementioned modem technology can achieve transmission with high bit rate. Nevertheless, the abovementioned modem technology has to use multiple bands. Because of the transmission energy is scattered in multiple carrier bands, the multi-carrier communication would have poor anti jamming capability on the daily existence of the wideband noise (such as voice, TV broadcast, hair dryer sound).

FSK (Frequency-Shift Keying) is a modulation technique by which data is transmitted by the modulated signal changing in the frequency. The most common case is binary FSK. Binary FSK is to utilize two different frequencies to respectively represent two different binary symbols which respectively represent logic 0 and logic 1. Since FSK belongs to a sort of single-carrier modulation, the energy is highly concentrated in a single carrier, and the environment wideband noise have less probability to match the communication frequency exactly, so single-carrier FSK is more suitable for audio frequency communication.

FIG. 1A is a circuit block diagram depicting a conventional FSK demodulation circuit 10. Referring to FIG. 1A, the FSK demodulation circuit 10 includes an analog-to-digital converter (ADC) 101, a spectrum analyzer 102, a binary data decision circuit 103, a package header comparing circuit 104 and ECC (error checking and correction) circuit 105.

The ADC 101 receives an analog modulated signal AS and converts the analog modulated signal AS to a digital signal DS. The spectrum analyzer 102 receives the digital signal DS and performs the spectrum energy analysis to the digital signal DS so as to output a frequency envelope FE. The binary data decision circuit 103 receives the frequency envelope FE and a symbol clock signal CK and samples the frequency envelope FE according to the symbol clock signal CK to decide a symbol binary data BD. The package header comparing circuit 104 is used for comparing the binary data BD with preset package header bits to obtain a package message PGM. The ECC circuit 105 receives the package message PGM to perform error correction to ensure the correctness of the package message PGM.

FIG. 1B is a waveform diagram depicting a conventional FSK demodulation. Referring to FIG. 1B, the waveform 106 represents a carrier; the waveform 107 represents a modulated signal; the waveform 108 represents a binary data to be transmitted; the waveform 108 represents the abovementioned clock signal CK. Since the binary data decision circuit 103 requires the clock signal CK to determine the transmitted data 108 in positive level of the clock signal CK, clock synchronization between the transmitter and the receiver in advance are required for the abovementioned modem technology in audio frequency, and then the transmitter can start to transmit the valid data. If a deviation of clock signal or an interference of the clock signal occurs in one of transmitter and receiver, timing error will be occurred at the transmitter or the receiver to induce error in the decoded data. Moreover, in process of transmission, the error of the clock signal of both of the transmitter and the receiver will be accumulated so that transmission data rate and robustness of the transmission system are hardly increased in the conventional modem technology in audio frequency.

U.S. Patent Publication No. 20050254344A1 and U.S. Pat. No. 4,320,387 relates to the single-carrier modulation in prior art. The U.S. Patent Publication No. 20050254344A1 is about FM or AM to be used for the modem technology thereof, and the U.S. Pat. No. 4,320,387 is about the FSK to be used for modem technology thereof. Nevertheless, in the abovementioned patent disclosures, since the frequency and the phase of the clock signal of the transmitter should be obtained by the receiver for performing demodulation, the clock synchronization or handshaking should be performed before transmission to confirm the frequency and the phase of the clock signal between the transmitter and the receiver in advance.

SUMMARY OF THE INVENTION

In view of this, it is therefore an objective of the present invention to provide a method and an apparatus for adaptive clock reconstruction such that the clock signal synchronous with clock of transmitter can be generated without handshaking for clock synchronization.

Another object of the present invention is to provide a method and an apparatus for decoding in audio frequency communication. An adaptive clock signal is provided for decoding so that the clock signals of transmitter and receiver can be synchronous even if an external interference occurs. Thus, high transmission data rate and robust transmission can be achieved.

To achieve the above-identified or other objectives, the present invention provides a method for adaptive clock reconstruction. The method comprises the steps of: receiving a modulated signal, wherein the modulated signal is modulated by Return to Carrier Frequency Shift Keying (hereinafter refer to as RC-FSK); performing a spectrum analysis to the modulated signal to obtain a plurality of frequency envelopes; storing the values of the frequency envelopes; searching peak values of the carrier frequency envelope and time points corresponding to the peak values to modify a symbol varying estimated period of the peak values; and generating a clock period of RC-FSK demodulation and a clock phase of RC-FSK demodulation according to the estimated period.

The present invention further provides a method for decoding in audio frequency communication. The method comprises the steps of: converting an external acoustic signal to a digital signal, wherein the acoustic signal comprises a modulated signal modulated by RC-FSK; performing a spectrum analysis to the digital signal to obtain a plurality of frequency envelopes; searching peak values of the carrier frequency envelope and time points corresponding to the peak values to modify a symbol verying estimated period of the peak values; generating a clock period and a clock phase of RC-FSK demodulation; generating a clock signal according to the clock period and the clock phase of RC-FSK demodulation; generating a binary data according to the shifting frequency envelopes and the clock signal; and comparing the binary data with preset package header bits to obtain a package message.

In addition, the present invention provides a modulating method for frequency shifting keying which is adapted for synchronizing a clock signal. The method comprises the steps of: (a) acquiring a digital data to prepare performing a transmission modulation; (b) adjusting a frequency of a carrier signal into a carrier frequency plus an offset frequency for a preset period according to the offset frequency corresponding to the digital data; and (c) adjusting the frequency of the carrier signal into the carrier frequency and returning to step (a).

In the method for adaptive clock reconstruction and the method for decoding in audio frequency according to the preferred embodiment of the present invention, generating the clock period of RC-FSK demodulation according to the estimated period comprises the steps of: searching carrier frequency envelope at least two latest peak values and calculating the instant interval between two time point of the latest two peak values; providing a weight value for the instant interval, wherein the weight value is between 0 and 1; determining the clock period of RC-FSK demodulation, wherein the instant interval is represented as $\tau$, the prior estimated period is represented as $T(n)$, the weight value is represented as $\alpha$, the updating clock period of RC-FSK demodulation is represented as $T(n+1)$, and the equation of the clock period of RC-FSK demodulation is represented as:

$$T(n+1)=T(n)\times(1-\alpha)+\tau\times\alpha.$$

In the method for adaptive clock reconstruction and the method for decoding in audio frequency according to the preferred embodiment of the present invention, calculating the clock phase (timing offset) of RC-FSK demodulation according to the estimated period comprises the steps of: searching a time point of the latest peak values in carrier frequency envelope, wherein the time point is represented as $P(n)$; predicting a future time point of a future peak value, wherein the future time point of the future peak value is represented as $P(n+k)$ and $P(n+k)=P(n)+T(n+1)\times k$, wherein k is a positive number; determining the clock phase of RC-FSK demodulation, wherein the estimated clock period is represented as $T(n+1)$, the estimated clock phase of shifting frequency period is represented as PH, and $PH=P(n)+T(n+1)\times k-0.5\times T(n+1)$.

The present invention additionally provides an apparatus for adaptive clock reconstruction. The apparatus comprises a register, a spectrum analyzer and a clock estimation unit. The spectrum analyzer receives a modulated signal and performs a spectrum analysis to the modulated signal to obtain a plurality of frequency envelopes, wherein the modulated signal is modulated by RC-FSK. The register is coupled to the spectrum analyzer for storing the frequency envelopes. The clock estimation unit is coupled to the register to search the peak values of the carrier frequency envelope and time points corresponding to the peak values to modify a estimated period of the peak values, and then calculates a clock period and a clock phase of RC-FSK demodulation according to the estimated period.

Moreover, the present invention provides an apparatus for decoding in audio frequency. The apparatus comprises a analog-to-digital converter (ADC), a register, a spectrum analyzer, a clock estimation unit, a binary data decision circuit and a package header comparing circuit. The ADC receives an external acoustic signal to convert the external acoustic signal to a digital signal, wherein the external acoustic signal comprises a modulated signal modulated by RC-FSK. The spectrum analyzer is used for performing a spectrum analysis to the digital signal to obtain a plurality of frequency envelopes. The register is coupled to the spectrum analyzer for storing the frequency envelopes. The clock estimation unit is coupled to the register to search peak values of the carrier frequency envelopes and time points corresponding to the peak values to estimate a estimated period of the peak value, afterward, calculates a clock period and a clock phase of RC-FSK demodulation according to the estimated period, and then, outputs a clock signal according to the clock period and clock phase of RC-FSK demodulation. The binary data decision circuit is coupled to the spectrum analyzer to receive the frequency envelopes and the clock signal to generate a binary data according to the frequency envelopes and the clock signal. The package header comparing circuit is coupled to the binary data decision circuit to receive the binary data, and then compares the binary data with package header bits to obtain a package message.

In the apparatus for adaptive clock reconstruction and the apparatus for decoding in audio frequency according to the preferred embodiment of the present invention, the apparatus for decoding in audio frequency further comprises an error checking and correction (ECC) circuit. The ECC circuit is coupled to the package header comparing circuit to receive the package message and then performs an error checking and correction to ensure the accuracy of the package message.

The spirit of the present invention is adaptive clock reconstruction, wherein a carrier signal is received in audio frequency for adaptively generating a synchronized clock signal so that transmitter and receiver can synchronize the clock signal without handshaking. The application of the present invention can greatly increase the transmission data rate and robustness of a transmission system.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE INVENTION

The present invention will be apparent from the following detailed description, which proceeds with reference to the accompanying drawings, wherein the same references relate to the same elements.

In conventional decoding technology in audio frequency, transmitter and receiver should synchronize the clock signal in advance so that valid data could start to be transmitted. If a deviation of clock source or an interference of clock source occurs in one of transmitter and receiver, timing error will be induced at the transmitter or the receiver to result in incorrect decoded information. Therefore, the present invention provides a method for adaptive clock reconstruction and a method for decoding in audio frequency so that a clock period and a clock phase are independently generated by the receiver for decoding information in audio frequency to increase the transmission data rate and robustness of the transmission system.

Figure 1A:
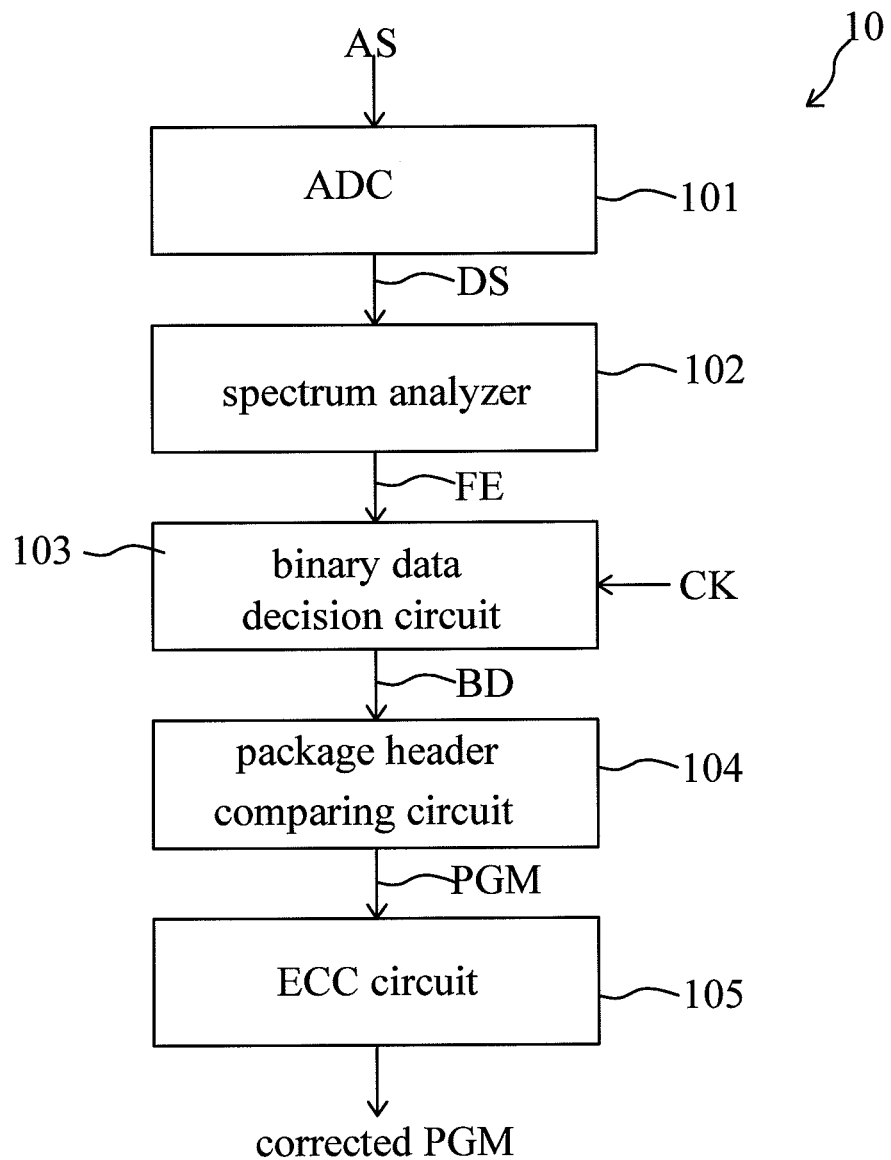
FIG. 1A is a circuit block diagram depicting a conventional FSK demodulation circuit 10.
Figure 1B:
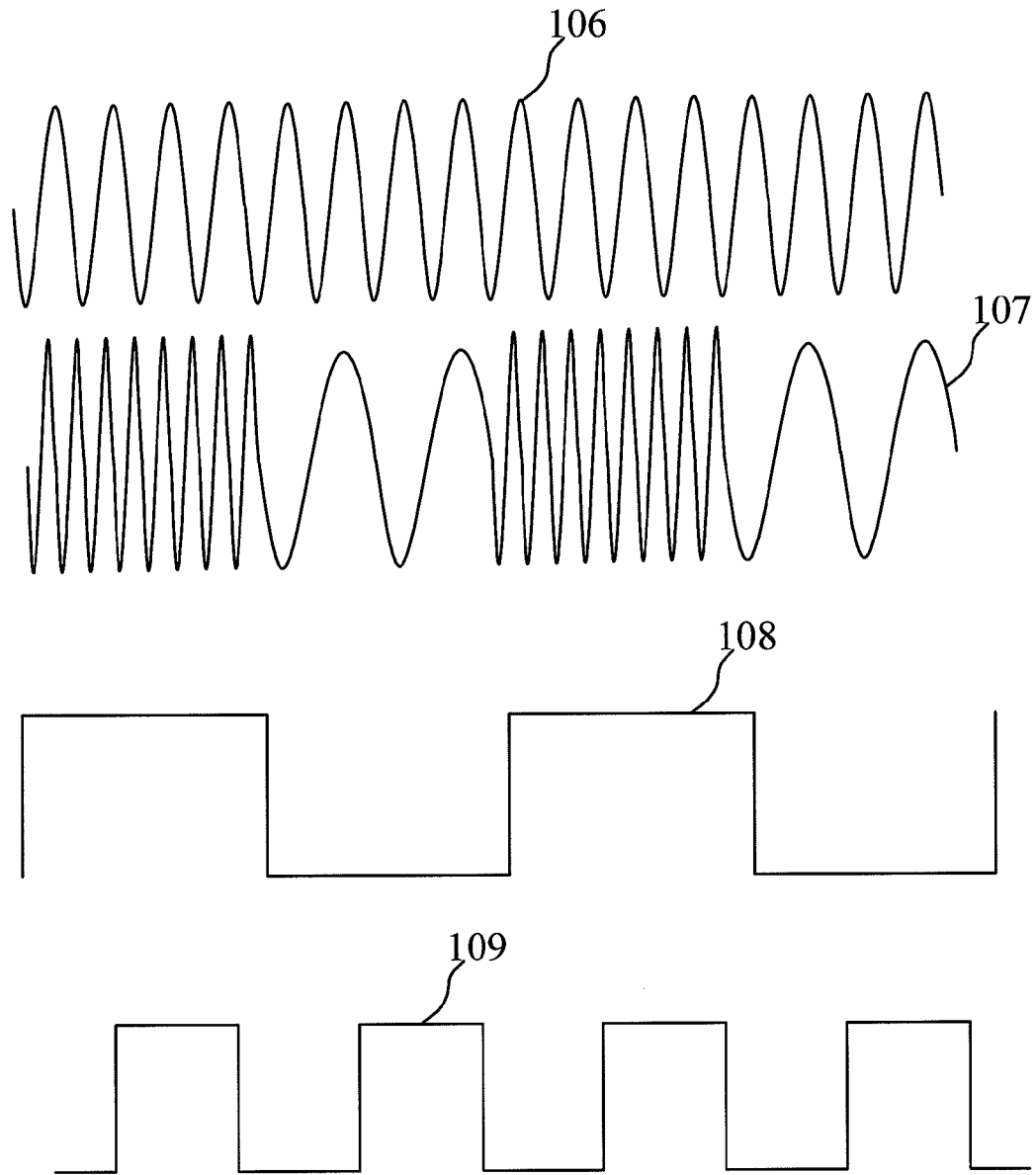
FIG. 1B is waveform diagram depicting a conventional FSK demodulation
Figure 2:
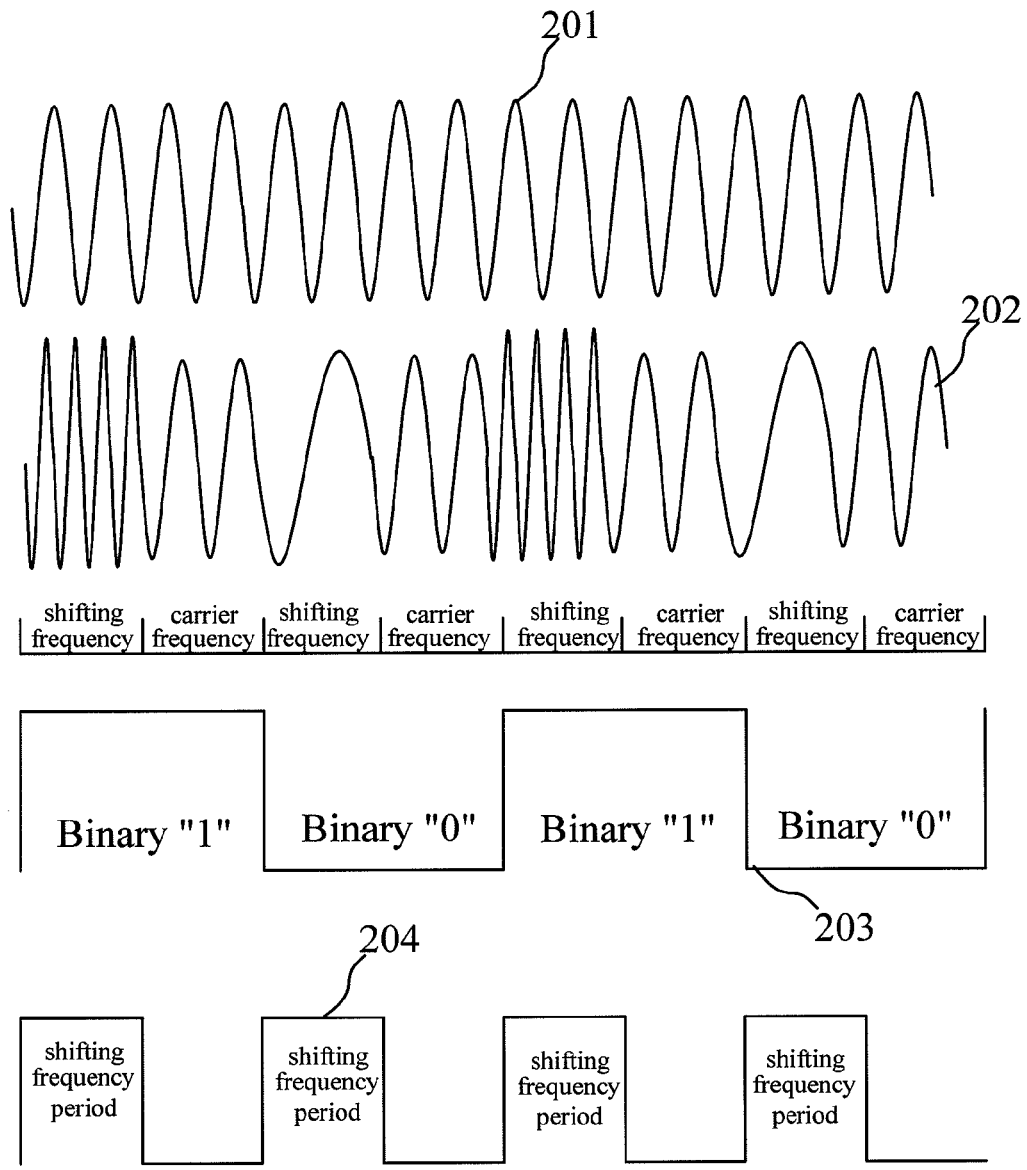
FIG. 2 is waveform diagram depicting RC-FSK demodulation according to the prior art.

FIG. 2 is a waveform diagram depicting Return-to-Carrier Frequency Shifting Keying (hereinafter refer to as RC-FSK) demodulation according to an embodiment of the present invention. Referring to FIG. 2, the waveform 201 represents a carrier; the waveform 202 represents a modulated signal; the waveform 203 represents a binary data to be transmitted; the waveform 204 represents the abovementioned clock signal CK. In the present embodiment of the present invention, the RC-FSK is provided. The RC-FSK of the present invention is a modulation technique whose the modulated frequency is changed from a non-zero shifting frequency (fc+Δf) to the carrier frequency (fc), wherein the non-zero shifting frequency (fc+Δf) represents a transmission data. The most common case is binary RC-FSK as shown in FIG. 2. Binary RC-FSK (hereinafter refer to as RC-BFSK) is to utilize two different non-zero shifting frequency to respectively represent two different binary symbols which respectively represent logic 0 and logic 1.

Figure 3:
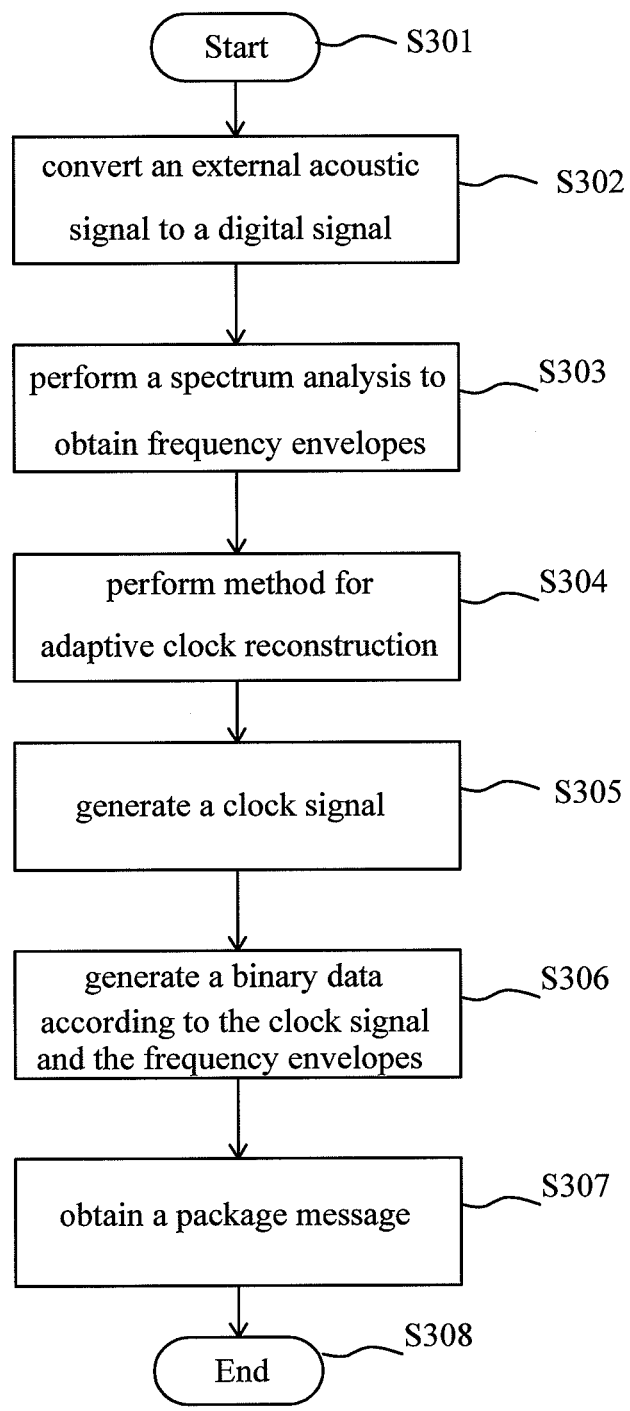
FIG. 3 is a flow chart depicting a method for decoding in audio frequency according to a preferred embodiment of the present invention.
Figure 4:
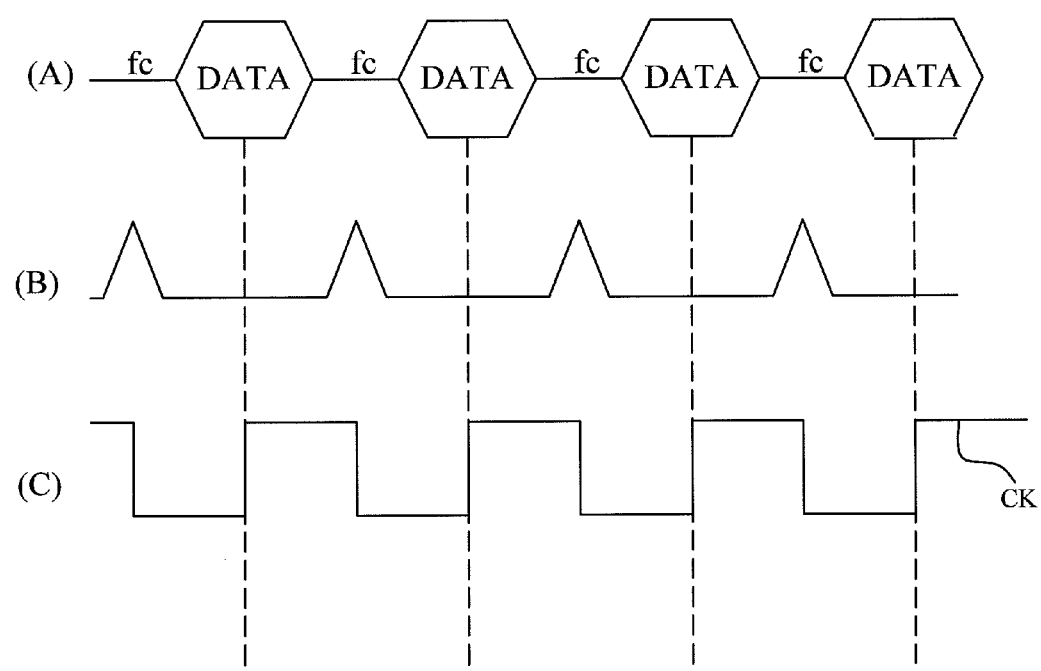
FIG. 4(A) a diagram depicting a frequency envelope of a modulated signal according to a preferred embodiment of the present invention.
FIG. 4(B) is a diagram depicting a carrier frequency envelope obtained from spectrum analysis to a modulated signal according to an preferred embodiment of the present invention.
FIG. 4(C) is a diagram depicting a clock signal according to a preferred embodiment of the present invention.

FIG. 3 is a flow chart depicting a method for decoding in audio frequency according to a preferred embodiment of the present invention. Referring to FIG. 3, in the present embodiment, receiver receives an external acoustic signal transmitted from transmitter, wherein the external acoustic signal includes a modulated signal. In order to conveniently describe the present embodiment, assume that the modulated signal is modulated by RC-FSK (shown in FIG. 2). In addition, assume that the carrier frequency fc of the modulation carrier signal is 18 KHz. The frequencies of the modulated frequency shifting signal include 17 KHz, 17.5 KHz, 18.5 KHz and 19 KHz to respectively represent different data for example. Moreover, the different data in the modulated signal are blocked by the carrier signal with the center frequency as shown in FIG. 4(A). FIG. 4(A) a diagram depicting a frequency envelope of a modulated signal according to a preferred embodiment of the present invention. Referring to FIG. 4(A), the carrier signal with the center frequency fc is transmitted between the transmissions of two adjacent data in the modulated signal. In other words, the frequency of the modulated signal is cyclically varied from 18 KHz to 17~19 KHz.

Hereinafter, the method for decoding in audio frequency in the embodiment of the present invention is described as follow. The method includes the steps of:

In step S301, the method starts.

In step S302, an external acoustic signal is converted to a digital signal by receiver.

In step S303, a spectrum analysis is performed to the digital signal by receiver to obtain a plurality of frequency envelopes. In the present embodiment, the spectrum analysis is for example performed in bandwidth of the carrier signal so that signal power around the carrier frequency fc with respect to time can be obtained as shown in FIG. 4(B). FIG. 4(B) is a diagram depicting a frequency envelope obtained from spectrum analysis to a modulated signal according to a preferred embodiment of the present invention. Referring to FIG. 4(B), since the frequency of the modulated signal is cyclically varied from 18 KHz to other frequencies, the frequency envelopes obtained from spectrum analysis will periodically elevate to a peak. In addition, when the peak occurs, the frequency of the modulated signal is close to the carrier frequency fc.

Figure 5:
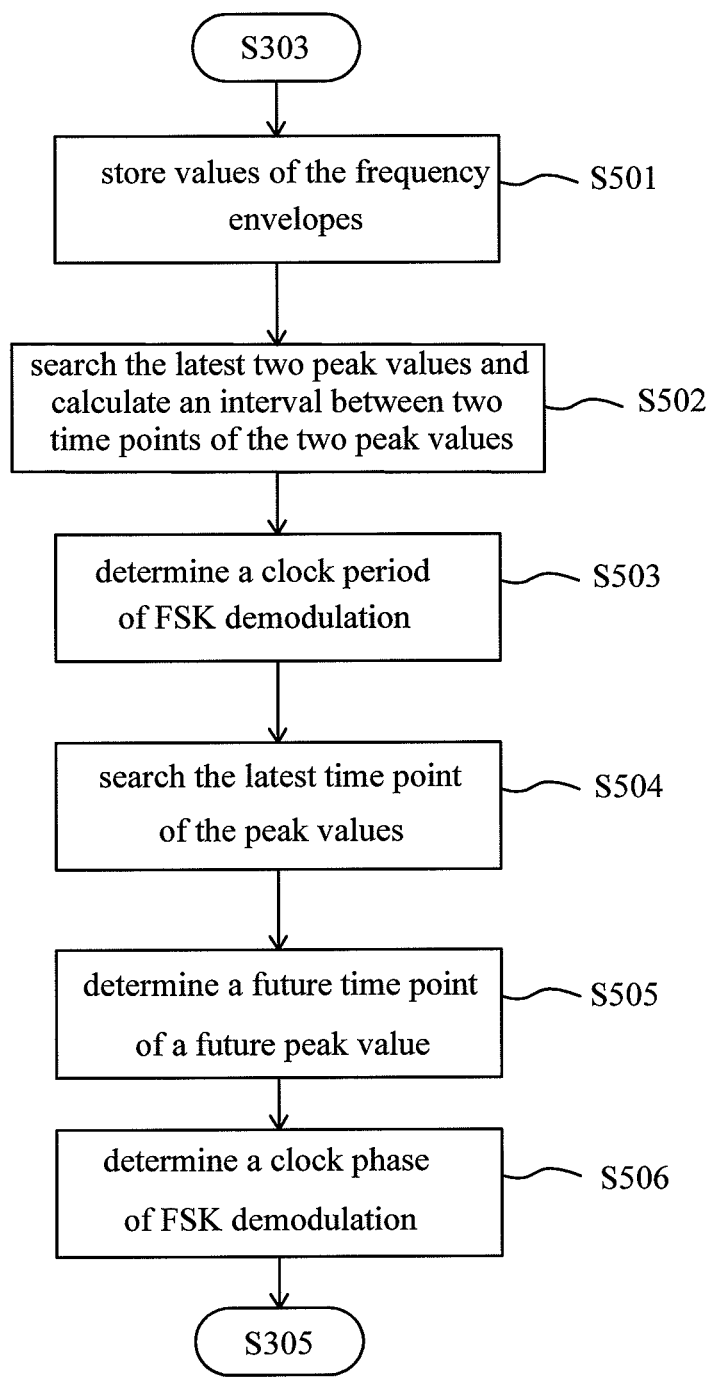
FIG. 5 is a flow chart depicting a method for adaptive clock reconstruction according to a preferred embodiment of the present invention.

In step S304, a method for adaptive clock reconstruction is performed by receiver to generate a clock period and a clock phase required by RC-FSK demodulation. The method for adaptive clock reconstruction in the present embodiment includes the sub-steps as shown in FIG. 5. FIG. 5 is a flow chart depicting a method for adaptive clock reconstruction according to a preferred embodiment of the present invention. Referring to FIG. 5, the step S304 includes the steps of:

In step S501, the values of the frequency envelopes are stored. Afterward, peak values of the frequency envelopes and time points corresponding to the peak values are searched and a estimated period of the peak values is estimated in steps S502~S506. Since the carrier signal with the center frequency is transmitted for a period between two adjacent transmitting data, the peak values can be obtained when the carrier signal with the center frequency fc is transmitted. Moreover, the peak values will be periodically occurred as shown in FIG. 4(B). In other words, an estimated period of the peak values is similar to a period of occurrence of the center frequency. Therefore, a clock period and a clock phase for decoding/demodulation will be obtained in the present embodiment when the estimated period of the peak values is evaluated.

In step S502, the latest two peak values are searched and an interval between two time point of the latest two peak values are modified, wherein the interval is represented as τ.

In step S503, a clock period of RC-FSK demodulation is determined. In the following, the prior estimated period is represented as T(n), and the new clock period of RC-FSK demodulation is represented as T(n+1). Therefore, the clock period T(n+1) of RC-FSK demodulation can be modified from the following equation:

$$T(n+1)=T(n)\times(1-\alpha)+\tau\times\alpha \qquad (1).$$

In the abovementioned equation (1), α represents a weight value. According to the equation (1), the clock period is continuously updated based on the interval τ of the latest peak values in the present embodiment. In addition, after a period of updating time, the obtained clock period of RC-FSK demodulation T(n+1) will approach the period when the carrier frequency fc occurs in the modulated signal.

The weight value α is used to determine that the affection of the interval τ for the clock period T(n+1) when the clock period τ is updated. The weight value α is between 0 and 1. In addition, by repeating experiments, a better result can be obtained if the weight value α is between 0 and 0.5. Moreover, when the weight value α is equal to 0.125, a precise clock period can be obtained.

In step S504, a time point of the latest peak value in carrier frequency envelope is searched. The time point of the latest peak value can be obtained by step S502, and it is represented as P(n).

In step S505, a future time point of a future peak value is determined, wherein the future time point of the future peak value is represented as P(n+k). The future time point of the future peak value P(n+k) can be modified according to the clock period T(n+1), and its equation is represented as:

$$P(n+k)=P(n)+T(n+1)\times k \qquad (2)$$

wherein k=1, 2, 3, 4, . . . .

In step S506, a clock phase of RC-FSK demodulation is determined, wherein the clock phase of RC-FSK demodulation is represented as PH. The clock phase of RC-FSK demodulation PH can be obtained by the following equation:

$$PH=P(n)+T(n+1)\times k-0.5\times T(n+1) \qquad (3).$$

According to equation (3), the clock phase PH is shifted for a half of the clock period T(n+1) from the time point P(n+k). Afterward, referring to FIG. 3, after the clock period and the clock phase of RC-FSK demodulation are calculated in step S304, the method further includes the following steps.

In step S305, a clock signal is generated according to the clock period and the clock phase of RC-FSK demodulation, wherein the clock signal may be shown as FIG. 4(C). FIG. 4(C) is a diagram depicting a clock signal according to a preferred embodiment of the present invention. Referring to FIG. 4(C), since the clock period T(n+1) and the clock phase PH are obtain from step S304, receiver can generate the clock signal CK with the clock period T(n+1) and the clock phase PH. Moreover, receiver can utilize the clock signal CK to perform demodulation to the received signal. Furthermore, according to step S503, the clock period T(n+1) will be updated according to the latest interval τ. Thus, the period of the clock signal generated by the receiver in the present embodiment will be adjusted due to the continuous updated clock period T(n+1); that is to say, the clock signal CK of receiver will be adaptively synchronized with the received modulated signal and the handshaking for clock synchronization with transmitter is unnecessary. In addition, an issue that clock signals of receiver and transmitter are asynchronous is hardly to occur even when the acoustic signal is affected by interference. Therefore, the accuracy of decoding/demodulation is increased, and the transmission data rate and robustness of the transmission system are greatly increased.

In step S306, a binary data is generated according to the clock signal and the frequency envelopes. In accordance with FIG. 4(A) and FIG. 4(C) of the present embodiment, edge trigger of the clock signal is utilized to determine the data in the frequency envelopes so that the binary data can be demodulated.

In step S307, the binary data is compared with package header bits to obtain a package message. In addition, receiver can perform ECC (error correcting code) correction and checksum to ensure the correctness of the package message. Since the post process after demodulating the binary data in the receiver is not the focus of the present invention, the detailed description is omitted.

In step S308, the method ends.

Figure 6:
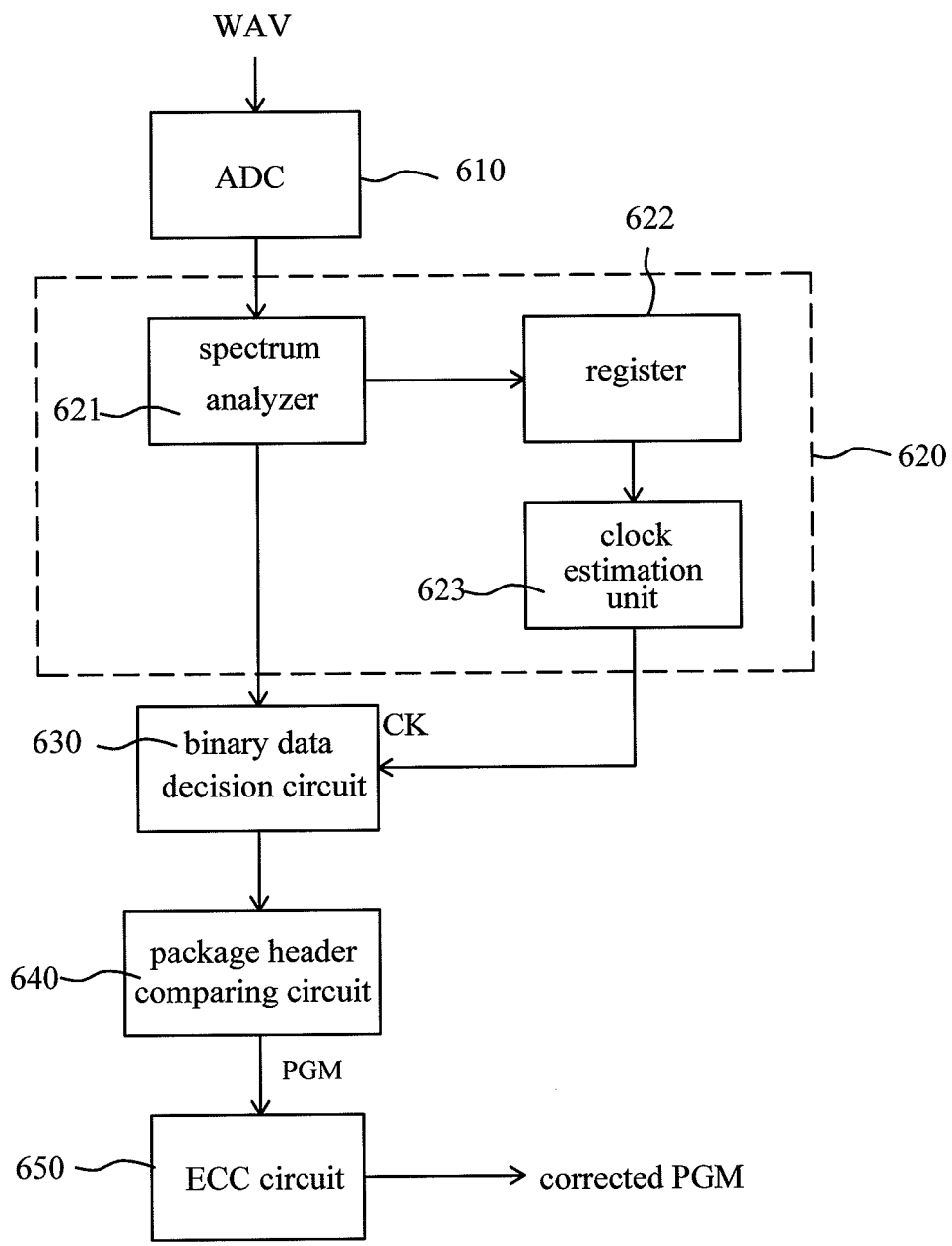
FIG. 6 is a block diagram depicting an apparatus for decoding in audio frequency according to a preferred embodiment of the present invention.

Another embodiment depicting an apparatus is provided for one of ordinary skilled in the art to implement the present invention through the abovementioned embodiment. FIG. 6 is a block diagram depicting an apparatus for decoding in audio frequency according to a preferred embodiment of the present invention. Referring to FIG. 6, the apparatus for decoding in audio frequency includes an analog-to-digital converter (ADC) 610, an apparatus for adaptive clock reconstruction 620, a binary data decision circuit 630 and a package header comparing circuit 640, wherein the apparatus for adaptive clock reconstruction 620 further includes a spectrum analyzer 621, a register 622 and a clock estimation unit 623.

The ADC 610 receives an external acoustic signal WAV to convert the external acoustic signal WAV to a digital signal. For conveniently describing the present embodiment, in the present embodiment, the external acoustic signal includes a modulated signal and the modulated signal is modulated by RC-FSK. The diagram of the modulated signal is shown as FIG. 4(A).

Next, the spectrum analyzer 621 performs a spectrum analysis to the digital signal to obtain a plurality of frequency envelopes, wherein the operation of the spectrum analyzer 621 is similar to the abovementioned step S303. Thus, the detailed description is omitted. The register 622 is coupled to the spectrum analyzer 621 to store the frequency envelopes. The clock estimation unit 623 is coupled to the register 622 to search peak values of the carrier frequency envelopes and time points respectively corresponding to the peak values to modify an estimated period of the peak values. In addition, the clock estimation unit 623 calculates the clock period T(n+1) and the clock phase PH of RC-FSK demodulation according to the estimated period. The operation of the clock estimation unit 623 is similar to the steps S502 to S506 in the abovementioned embodiment so that the detail description is omitted. Moreover, the clock estimation unit 623 outputs a clock signal CK according to the clock period T(n+1) and the clock phase PH of RC-FSK demodulation.

Afterward, the binary data decision circuit 630 is coupled to the spectrum analyzer 621 and the clock estimation unit 623 to generate a binary data according to the clock signal CK and the frequency envelopes. The operation of the binary data decision circuit 630 is similar to the abovementioned step S306 so that the detailed description is omitted. The package header comparing circuit 640 is coupled to the binary data decision circuit 630 to receive the binary data for comparing the binary data with the package header bits to obtain the package message PGM. In addition, the apparatus for decoding in audio frequency may further includes an error checking and correction (ECC) circuit 650, wherein the ECC circuit 650 is coupled to the package header comparing circuit 640 to receive the package message PGM and to perform the ECC code correction to output a corrected package message PGM to ensure the correctness of the package message PGM.

In summary, the spirit of the present invention is adaptively to generate a clock signal required by decoding/demodulation. In addition, the handshaking for clock synchronization between a receiver and a transmitter is unnecessary, and the generated clock signal can synchronize with the clock signal of transmitter. Moreover, in transmission of the modulated signal, the present invention can utilize the received modulated signal to adaptively update the clock signal required by decoding/demodulation. Thus, clock signals of the receiver and the transmitter are hardly asynchronous even when the acoustic signal is affected by interference. Therefore, the accuracy of decoding/demodulation is increased, and the transmission data rate and robustness of the transmission system will be increased in the present invention.

While the invention has been described by way of examples and in terms of preferred embodiments, it is to be understood that the invention is not limited thereto. To the contrary, it is intended to cover various modifications. Therefore, the scope of the appended claims should be accorded the broadest interpretation so as to encompass all such modifications.

What is claimed is:

1. A method for adaptive clock reconstruction, comprising:
receiving a modulated signal, wherein the modulated signal is modulated by Return to Carry Frequency Shifting Keying (hereinafter refer to as RC-FSK);
performing a spectrum analysis to the modulated signal to obtain a plurality of frequency envelopes;
storing values of the frequency envelopes;
searching peak values of the carrier frequency envelope and time points corresponding to the peak values to modify an estimated period of the peak values; and
calculating a clock period of RC-FSK demodulation and a clock phase of RC-FSK demodulation according to the estimated period.

2. The method for adaptive clock reconstruction according to claim 1, wherein calculating the clock period of RC-FSK demodulation according to the estimated period comprises:
searching at least two latest peak values and calculating an interval between two time points of the two peak values;
providing a weight value for the interval, wherein the weight value is between 0 and 1; and
determining the clock period of RC-FSK demodulation, wherein the interval is represented as $\tau$, the estimated period is represented as $T(n)$, the weight value is represented as $\alpha$, the clock period of RC-FSK demodulation is represented as $T(n+1)$, and the equation of the clock period of RC-FSK demodulation is represented as:

$$T(n+1)=T(n)\times(1-\alpha)+\tau\times\alpha.$$

3. The method for adaptive clock reconstruction according to claim 2, wherein the weight value is between 0 and 0.5.

4. The method for adaptive clock reconstruction according to claim 3, wherein the weight value is 0.125.

5. The method for adaptive clock reconstruction according to claim 2, wherein calculating the clock phase of RC-FSK demodulation according to the estimated period comprises:
searching a time point of the latest peak value, wherein the time point of the latest peak value is represented as $P(n)$;
defining a future time point of a future peak value, wherein the future time point of the future peak value is represented as $P(n+k)$, and $$P(n+k)=P(n)+T(n+1)\times k,$$

wherein k is a positive integer; and
defining the clock phase of RC-FSK demodulation, wherein the clock phase of RC-FSK demodulation is represented as PH, and $$PH=P(n)+T(n+1)\times k-0.5\times T(n+1).$$

6. An apparatus for clock reconstruction, comprising:
a spectrum analyzer, for receiving a modulated signal and performing a spectrum analysis to the modulated signal to obtain a plurality of frequency envelopes, wherein the modulated signal is modulated by frequency shift keying (RC-FSK);
a register, coupled to the spectrum analyzer, for storing the frequency envelopes; and
a clock estimation unit, coupled to the register for searching peak values of the frequency envelopes and time points corresponding to the peak values to estimate an estimated period of the peak values, and calculating a clock period of RC-FSK demodulation and a clock phase of RC-FSK demodulation according to the estimated period.

7. The apparatus for clock reconstruction according to claim 6, wherein when the clock estimation unit calculates the clock period of RC-FSK demodulation according to the estimated period, the clock estimation unit performs the following steps of:
searching at least two latest peak values and calculating an interval between two time points of the two peak values;
providing a weight value for the interval, wherein the weight value is between 0 and 1; and
determining the clock period of RC-FSK demodulation, wherein the interval is represented as $\tau$, the estimated period is represented as $T(n)$, the weight value is represented as $\alpha$, the clock period of RC-FSK demodulation is represented as $T(n+1)$, and the equation of the clock period of RC-FSK demodulation is represented as:

$$T(n+1)=T(n)\times(1-\alpha)+\tau\times\alpha.$$

8. The apparatus for clock reconstruction according to claim 7, wherein the weight value is between 0 and 0.5.

9. The apparatus for clock reconstruction according to claim 8, wherein the weight value is 0.125.

10. The apparatus for clock reconstruction according to claim 7, wherein when the clock estimation unit calculates the clock phase of RC-FSK demodulation according to the estimated period, the clock estimation unit performs the following steps of:
searching a time point of the latest peak value, wherein the time point of the latest peak value is represented as $P(n)$;
defining a future time point of a future peak value, wherein the future time point of the future peak value is represented as $P(n+k)$, and $$P(n+k)=P(n)+T(n+1)\times k,$$

wherein k is a positive integer; and
defining the clock phase of RC-FSK demodulation, wherein the clock phase of RC-FSK demodulation is represented as PH, and $$PH=P(n)+T(n+1)\times k-0.5\times T(n+1).$$

11. A method for decoding in audio frequency, comprising:
converting a external acoustic signal to a digital signal, wherein the external acoustic signal comprises a modulated signal modulated by frequency shift keying (RC-FSK);
performing a spectrum analysis to the digital signal to obtain a plurality of frequency envelopes;
searching peak values of the frequency envelopes and time points corresponding to the peak values to estimate an estimated period of the peak values;
calculating a clock period of RC-FSK demodulation and a clock phase of RC-FSK demodulation according to the estimated period;

generating a clock signal according to the clock period and the clock phase of RC-FSK demodulation;
generating a binary data according to the clock signal and the frequency envelopes; and
comparing the binary data with a preset package header bits to obtain a package message.

12. The method decoding in audio frequency according to claim 11, wherein calculating the clock period of RC-FSK demodulation according to the estimated period comprises:
searching at least two latest peak values and calculating an interval between two time points of the two peak values;
providing a weight value for the interval, wherein the weight value is between 0 and 1; and
determining the clock period of RC-FSK demodulation, wherein the interval is represented as $\tau$, the estimated period is represented as $T(n)$, the weight value is represented as $\alpha$, the clock period of RC-FSK demodulation is represented as $T(n+1)$, and the equation of the clock period of RC-FSK demodulation is represented as:

$$T(n+1)=T(n)\times(1-\alpha)+\tau\times\alpha.$$

13. The method decoding in audio frequency according to claim 12, wherein the weight value is between 0 and 0.5.

14. The method decoding in audio frequency according to claim 13, wherein the weight value is 0.125.

15. The method decoding in audio frequency according to claim 12, wherein calculating the clock phase of RC-FSK demodulation according to the estimated period comprises:
searching a time point of the latest peak value, wherein the time point of the latest peak value is represented as $P(n)$;
defining a future time point of a future peak value, wherein the future time point of the future peak value is represented as $P(n+k)$, and $$P(n+k)=P(n)+T(n+1)\times k,$$

wherein k is a positive integer; and
defining the clock phase of RC-FSK demodulation, wherein the clock phase of RC-FSK demodulation is represented as PH, and $$PH=P(n)+T(n+1)\times k-0.5\times T(n+1).$$

16. An apparatus for decoding in audio frequency, comprising:
a analog to digital converter (ADC), for receiving an external acoustic signal and converting the external acoustic signal to a digital signal, wherein the external acoustic signal comprises a modulated signal modulated by frequency shift keying (RC-FSK);
a spectrum analyzer, for performing a spectrum analysis to the modulated signal to obtain a plurality of frequency envelopes;
a register, coupled to the spectrum analyzer, for storing the frequency envelopes;
a clock estimation unit, coupled to the register, for searching peak values of the frequency envelopes and time points corresponding to the peak values to modify an estimated period of the peak values and calculating a clock period of RC-FSK demodulation and a clock phase of RC-FSK demodulation according to the estimated period, and output a clock signal according to the clock period and the clock phase;
a binary data decision circuit, coupled to the spectrum analyzer and the clock estimation unit, for generating a binary data according to the clock signal and the frequency envelopes; and a package header comparing circuit, coupled to the binary data decision circuit, for receiving the binary data and comparing the binary data with a preset package header bits to obtain a package message.

17. The apparatus for decoding in audio frequency according to claim 16, wherein when the clock estimation unit calculates the clock period of RC-FSK demodulation according to the estimated period, the clock estimation unit performs the following steps of:
searching at least two latest peak values and calculating an interval between two time points of the two peak values;
providing a weight value for the interval, wherein the weight value is between 0 and 1; and
determining the clock period of RC-FSK demodulation, wherein the interval is represented as $\tau$, the estimated period is represented as $T(n)$, the weight value is represented as $\alpha$, the clock period of RC-FSK demodulation is represented as $T(n+1)$, and the equation of the clock period of RC-FSK demodulation is represented as:

$$T(n+1)=T(n)\times(1-\alpha)+\tau\times\alpha.$$

18. The apparatus for decoding in audio frequency according to claim 17, wherein the weight value is between 0 and 0.5.

19. The apparatus for decoding in audio frequency according to claim 18, wherein the weight value is 0.125.

20. The apparatus for decoding in audio frequency according to claim 17, wherein when the clock estimation unit calculates the clock phase of RC-FSK demodulation according to the estimated period, the clock estimation unit performs the following steps of:
searching a time point of the latest peak value, wherein the time point of the latest peak value is represented as $P(n)$;
defining a future time point of a future peak value, wherein the future time point of the future peak value is represented as $P(n+k)$, and $$P(n+k)=P(n)+T(n+1)\times k,$$

wherein k is a positive integer; and
defining the clock phase of RC-FSK demodulation, wherein the clock phase of RC-FSK demodulation is represented as PH, and $$PH=P(n)+T(n+1)\times k-0.5\times T(n+1).$$

21. A modulating method for frequency shifting keying, adapted for synchronizing a clock signal and modulating a digital data to output a modulated signal, wherein the modulating method for return-to-carrier frequency shifting keying is used in a transmitter, the method comprising:
(a) providing a carrier signal with a center frequency;
(b) preparing to perform a transmission modulation for the digital data;
(c) adjusting a frequency of a carrier signal into a carrier frequency to change the carrier frequency of the modulated signal from the center frequency to the carrier frequency plus an offset frequency for a preset period according to the offset frequency corresponding to the digital data;
(d) adjusting the frequency of the carrier signal to change the carrier frequency of the modulated signal back to the center frequency; and
(e) returning to step (b),
wherein the modulating method is performed using the transmitter.

* * * * *